United States Patent [19]

Lesoille

[11] 4,342,591

[45] Aug. 3, 1982

[54] PROCESS FOR THE RECOVERY OF GOLD AND/OR SILVER AND POSSIBLY BISMUTH CONTAINED IN SULFURETTED ORES AND/OR SULFOARSENIDES

[75] Inventor: Marcel Lesoille, Corbais, Belgium

[73] Assignee: Mines et Produits Chimiques de Salsigne, Conques-Sur-Orbiel, France

[21] Appl. No.: 258,306

[22] Filed: Apr. 28, 1981

[30] Foreign Application Priority Data

Jun. 3, 1980 [FR] France ................................ 80 12303

[51] Int. Cl.$^3$ ....................... C22B 11/04; C22B 61/00
[52] U.S. Cl. .................................... 75/101 R; 75/109; 75/118 R; 75/121; 75/7; 423/27; 423/41
[58] Field of Search ............. 75/7, 101 R, 109, 118 R, 75/121; 423/27

[56] References Cited

U.S. PATENT DOCUMENTS

| | | | |
|---|---|---|---|
| 1,818,846 | 8/1931 | Giles | 75/118 R |
| 2,304,427 | 12/1942 | Sibley | 75/118 R |
| 2,596,580 | 5/1952 | McKay | 75/118 R |
| 2,686,114 | 8/1954 | McGauley | 75/118 R |
| 4,185,996 | 1/1980 | Zambrano | 75/7 |

OTHER PUBLICATIONS

*Chemical Abstracts*, vol. 81, (1974), Nos. 9111s, 139006x.
*Chemical Abstracts*, vol. 71, (1969), No. 15,231r.
*Chemical Abstracts*, vol. 57, (1962), No. 10,888e.

*Primary Examiner*—Brian E. Hearn
*Attorney, Agent, or Firm*—Poms, Smith, Lande & Rose

[57] ABSTRACT

The present invention relates to a process for the recovery of gold and/or silver and possibly bismuth contained in sulfuretted ores and/or sulfoarsenides, wherein said ores, after having been subjected to a reducing roasting, then to an oxidizing roasting then a possible crushing, are treated by a first lixiviation with sulfuric acid followed by a lixiviation with thiourea under precise conditions of operation.

5 Claims, No Drawings

PROCESS FOR THE RECOVERY OF GOLD AND/OR SILVER AND POSSIBLY BISMUTH CONTAINED IN SULFURETTED ORES AND/OR SULFOARSENIDES

The present invention relates to a process combining pyro- and hydrometallurgical techniques for recovering gold and/or silver and possibly bismuth contained in sulfuretted ores and/or sulfoarsenides.

In addition to a gangue constituted essentially of oxides, silicates, carbonates, etc... which are non-valorizable, sulfuretted ores and/or sulfoarsenides contain sulfuretted derivatives and/or sulfoarsenides of metals such as iron, copper, arsenic, bismuth, antimony, lead and zinc and precious metals including gold and silver. Every effort has always been made to find processes for recovering the precious metal or metals contained in the ores of this type and possibly for recovering certain of the metals present in in said ores.

In all the known processes for effecting these recoveries, the gangue is firstly separated from the metallic derivatives to be treated.

From the metallic derivatives (sulfides and/or sulfoarseniuretted) which may be used, it is known to recover the gold and/or silver contained therein by a treatment of cyanidation. In this process, the gold-bearing or silver-bearing derivative is firstly concentrated then dissolved in a basic solution of an alkaline cyanide. However, even carried out after roasting, this process does not always make it possible to recover, in suitable manner, the precious metals contained in the derivatives of which the attacking residues titre less than 10 to 20 g of gold and in which these precious metals (gold or silver) are in the form of pyrites, arsenopyrites or solid solutions of these products. It is for this reason that the techniques of cyanidation have, up to the present time, essentially been applied to ores (or concentrates of ores) for which the yield fluctuations, due to the irregularities in distribution if the precious metal in the sulfides, have little effect on the overall results.

Another process for recovering precious metals is also known, based on the treatment of the concentrated metallic derivatives with the aid of solutions of thiourea. The known process consists in effecting this treatment at a pH close to 2 and in the presence of an oxidising agent such as ferric iron or hydrogen peroxide. Under these conditions, the thiourea reacting with the gold and silver is known to produce soluble complexes.

Finally, it is known that, from suitable solutions of compounds (or of complexes) of gold and silver, it is possible to recover these metals by effecting a reaction of cementation with, for example, powder of aluminium.

It has now been found, and this is the object of the present invention, that it is possible to recover the gold and/or silver and/or bismuth contained in a sulfuretted and/or sulfoarseniuretted ore, industrially and economically, as soon as such an ore comprises at least 1 to 10 g of gold per ton, 5 to 200 g of silver per ton, 1000 to 5000 g of bismuth per ton; obviously, such an ore also comprises derivatives (sulfides or sulfoarsemides) of other metals such as iron, copper, arsenic, antimony, ... . in combined form.

The process according to the invention is characterized in that the ore, from which the gangue has been removed according to known processes, is treated in accordance with the following operations:

a first step of roasting (of the concentrated ore), called reducing roasting; this roasting will be carried out in a controlled atmosphere so as to volatilize both the labile sulfur and volatile sulfides, essentially sulfides based on arsenic, bismuth and antimony but maintaining the metallic derivative essentially for the form of sulfides;

a second step of roasting, called oxidising roasting; this roasting will be carried out in a strongly oxidising atmosphere and at a sufficient temperature to convert the comlex sulfides into corresponding oxides whilst promoting the formation of porous particles—hereinafter called "calcine";

a possible crushing of the product obtained after the so-called oxidising roasting;

a first step of lixiviation of the crushed calcine by sulfuric acid at a temperature of about 20° to 85° C. and for a period of 0.5 to 3 hours, with a sulfuric acid solution containing about 20 to about 120 g of sulfuric acid per litre; the purpose of this first lixiviation is to eliminate the greater part of the soluble iron, copper and arsenic in order to reduce the consumption of thiourea in the second lixiviation step;

a second lixiviation, effected on the solid particles coming from the first lixiviation, this lixiviation being made by a sulfuric acid thiourea solution containing 10 to 50 g/l of thiourea, at a pH of between 0.7 and 1.5, at a temperature of 20° to 70° C. and for a duration of 15 mins. to 5 hrs., this lixiviation being effected so that the potential of oxidoreduction of the medium is maintained at a value of between about 100 and about 180 mV;

the solution obtained in this second lixiviation, after filtration, treated by cementation according to a known process so as to recover the gold, silver and bismuth that it contains; this cementation is effected for example with the aid of powder of aluminium, at a temperature of the order of 70° C.

After filtration to recover the cement, the solutions are recovered and treated, wholly or partly, in order to avoid an accumulation of the impurities and to be able to be recycled.

The raw ore is subjected to a known preliminary operation for separating the actual ore from the gangue. This step comprises for example operations of crushing, homogenization, flotation, and its purpose is to obtain a concentrated ore having for example of the order of 20 to 40 g of gold per ton, 100 to 150 g of silver per ton and from 0.2 to 0.5% of bismuth.

During the first roasting step, the concentrated ore is subjected to roasting in a reducing atmosphere. In fact, this is simply a heating of the ore up to a temperature of about 680° to 720° C. In the course of this heating, the volatile parts of the ore and in particular the free sulfur and the sulfides of arsenic, bismuth and antimony are volatilised. The reactions of decomposition and volatilisation of these sulfides are endothermic and require an outside heat supply. The reducing temperature is regulated so that the combustible assembly, composed of the make-up combustible, free sulfur and volatilized sulfides, is lacking air with respect to the stoechiometry of the reactions of oxidation. Methodical furnaces (furnaces with superposed hearths) or fluidised bed furnaces may be used. However, it has appeared that the rate of volatilization of the volatile sulfides of arsenic, antimony and bismuth, was greater in a methodical furnace than in a fluidised bed furnace. Thus, for example, taking a concentrated ore containing 20 to 25% arsenic and treating it by a progressive heating in a furnace with superposed hearths so that the product is progressively taken, as the matter progresses on the hearths, from ambient temperature to the temperature of 720° C., the heat supply in the upper parts of the furnace being made on the one hand by the sensible heat of the fumes coming from the lower parts and on the other hand by the controlled reoxidation, so as to maintain the reducing state, of the volatilized sulfides; the heat supply in the lower parts is both due to the make-up combustible (gas or fuel oil) and to the reoxidation of the volatilized sulfides; whilst controlling this combustion and this reoxidation in order to maintain the reducing state, this content of arsenic is reduced, in the roasted ore, to about 0.1 to 0.5%, which, taking into account the loss in weight during this roasting, ensures a rate of elimination of the arsenic higher than 99%.

In the case of the furnace with superposed hearths, the retention time may, moreover, be adjusted so as to guarantee such rates of volatilization. The retention time is, in the example envisaged and for the temperature profile indicated, adjusted between 3 and 4 hours.

In the example envisaged, and for the temperature profile taught, the rate of volatilisation of the antimony is of the same order of size as that of the arsenic, but that of bismuth does not exceed 75%. If it is desired to promote the elimination of bismuth, the temperature profile must be raised by about 100° C., all other conditions of operation remaining identical.

The gaseous products which are released during this roasting may be recovered, if economic conditions are favourable, and produce dust rich in bismuth and antimony, arsenic trioxide and sulfuric acid. The process also produces energy which may be efficiently used, particularly for drying the concentrates leaving the flotation.

In order to render the whole of this process as efficient as possible, if it of prime importance, during this first roasting step, to avoid any formation of magnetic and consequently to give the roasted product a structure similar to pyrrhotite. This structure corresponds to a maximum porosity best guaranteeing the continuation of the process. The above description corresponds to the best experimental conditions found for ensuring this result.

During the second roasting step, the roasted product obtained after the first roasting is retreated in an oxidising medium. The product is heated to a temperature of about 550° to 630° C. The purpose of roasting is to convert the complex sulfides formed during the first roasting phase into oxides whilst maintaining maximum porosity for the grains.

This roasting is carried out in a furnace with fluidised bed, respecting strict operating instructions enabling a final calcine to be obtained, having the required properties:
the oxidising roasting is carried out in the presence of a controlled excess of air. This excess of air must correspond to the optimum of sulfating. This optimum sulfating varies according to the composition of the ores treated. In the present case, it is at a value of about 35%.
the speed of fluidisation must be determined on the one hand as a function of the particle size of the product and, on the other hand, so that the flying products, recovered at the cyclones, are correctly roasted and have sufficient characteristics to be treated directly in the hydrometallurgical process.

In the present case, for a mean particle diameter of 24 microns, the speed in the zone of disengagement of the fluidised bed was about 0.3 m/s. Under these conditions, the flying-off rate was 40%.

The combination of the first two instructions fixes, for a given product, the main characteristics of dimensioning of the furnace with fluidised bed.

The thermic conditions of the furnace must be adjusted so that the formation of recrystallised hematite is entirely avoided, this giving the mass a maximum porosity.

To this effect, the temperature and the dwell time of this roasting must be strictly controlled; in view of the considerable exothermicity of the reactions coming into play, and in order to be able to respect the temperature limits imposed (550°-630° C.), it is indispensable to be able to extract calories from the bed by the introduction of a heat exchanger in the bed itself.

As in the case of the first step of roasting, the fumes are treated in an installation for producing sulfuric acid, after passage in a recovery boiler coupled with the heat exchanger installed in the bed (known system).

After these two roasting steps, the roasted concentrated ore - subsequently called calcine - is in the form of two products:
the overflow representing about 60% by weight is constituted by the coarsest parts of the starting ore which will undergo the subsequent recrushing operation;
the products recovered at the cyclones, representing about 40% by weight, are constituted by the finest parts. They are not recrushed and directly supply the acid lixiviation vats.

In the case of the products treated by the Mines et Produits chimiques de Salsigne, the average analysis of this mixture is as follows:

of the order of 20 to 100 g of gold per ton
of the order of 100 to 500 g of silver per ton
of the order of 300 to 500 kg of iron per ton
of the order of 6 to 10 kg of copper per ton
of the order of 1 to 10 kg of arsenic per ton
of the order of 1 to 5 kg of bismuth per ton
of the order of 0.1 to 5 kg of antimony per ton.

However, there is no upper limit, in the process described, in the Au, silver and Bi contents. The only limiting values are those of arsenic, antimony, which are dependent on the conditions of roasting described hereinbefore.

In the following process, the calcine coming from the overflow and representing approximately 60% by weight of the total calcine, is subjected to a recrushing operation intended to bring the particle size to about 80 to 90% of particles smaller than 74 microns.

The whole of the calcine (recrushed overflow and products recovered at the cyclones) is then subjected to an acid lixiviation phase.

This phase consists in placing the ore in contact with an aqueous solution containing 20 to 120 g of sulfuric acid per liter of solution; about 2 parts by weight of aqueous sulfuric solution will generally be used for 1 part by weight of calcine. The temperature at which lixiviation is effected may vary from 20° to 85° C. about. The purpose of this lixiviation is to eliminate a large part of the copper, arsenic and sulfated ferrous and ferric iron which are still present in the calcine; in practice, the lixiviation yields are 70 to 90% for copper, 60 to 85% for arsenic and more than 95% for the soluble iron.

It has been noted that, insofar as the quantities of free MgO and CaO were relatively low in the treated ore, the quantities of acid consumed also remained low. At the end of lixiviation, the solid is separated from the acid solutions and the latter are treated by one of the known processes for recovering copper therefrom (cementation, precipitation, extraction by solvent) and for elimination the iron, arsenic and other impurities in the form of an insoluble precipitate easily storable and involving no risk for the environment.

After this acid lixiviation operation and after solid-liquid separation by filtration, the solid particles are subjected to a lixiviation with thiourea in a sulfuric acid medium; this lixiviation is carried out between 20° and 70° in an acid medium (pH between 0.7 and 1.5) and consists in placing the solids into contact with aqueous solutions containing from 10 to 50 g/l of thiourea. It is known that, in an attack of this type, the thiourea will complex the metals and in particular gold, silver and bismuth present in the calcine to dissolve them in the aqueous phase. Such a solubilisation had already been described earlier and the simultaneous use (in the attacking solution) of an oxidising agent such as hydrogen peroxide, a peroxide, a persulfate or ferric chloride, was recommended; it has been found that the attack of the concentrated, roasted and acid-lixiviated ores according to the present invention had to be carried out in the presence of reducing compounds (for example $SO_2$ or pyrrhotite coming from the first roasting step) which make it possible to regularise the potential of the attacking medium, in the course of the reaction, to a potential of oxidoreduction of between 100 mV and 160 mV in order to limit the consumption of thiourea. The potential of oxidoreduction in question is the one which may be measured with respect to a calomel reference electrode in a solution of quinhydrone.

At the end of this phase of solubilisation of the gold and the silver contained in the treated solid (it may be considered that the rates of solubilisation are of the order of at least 90% for gold and at least 60% for silver), there is a fresh solid-liquid separation by filtration. The solutions rich in gold and silver may be treated by known processes, for example by hot cementation (70° C.) with powder of aluminum in order to recover the precious metals in the form of a directly valorizable cement.

The solutions from cementation undergo an operation of purification by neutralization with lime, on a partial flow, in order to maintain the impurities present such as iron, aluminum, magnesium, arsenic... constant at a certain level without involving loss of thiourea. After separation by filtration of these precipitated impurities, the whole of the flow coming from the purification drain and the non-purified flow pass into an evaporator in order to ensure the voluminal balance of the process. The desired volume of solution containing the thiourea is thus collected at the head of the process. The titre of thiourea is adjusted at the level of the supply buffer vats by addition of fresh thiourea.

The following non-limiting example illustrates the invention. The starting product is a mixture of two typical ores from the Salsigne mines. The mixture is characterised by a given ratio of arsenopyrite and of pyrite.

After separation of the gangue, the concentrated ore contained about 28% sulfur, 24% arsenic, 0.35% copper and 0.3% bismuth. This crushed core was subjected successively to:

a reducing roasting in a furnace with superposed hearths, according to a temperature profile extending from 450° C. for the upper parts of the furnace to 720° C. in the lower parts. All these conditions explained hereinbefore for this first roasting step were fulfilled and a roasted product essentially constituted by pyrrhotite was obtained, the formation of magnetite having been completely avoided;

an oxidising roasting in a fluidised bed furnace at a temperature of 590° to 620° C. under the conditions described hereinbefore. 60% of calcine in overflow and 40% in cyclones was in fact obtained. The overflow underwent a recrushing operation so as to bring the particle size to 85% particles smaller than 74 microns. The mean analysis of the 60% recrushed overflow, 40% cyclone products mixture was as follows:

Au: 58–60 ppm
Ag: 130–150 ppm
Fe: 50.3%
Cu: 0.6%
As: 0.25%
Bi: 0.15%

The mixture thus produced was treated in the following manner.

1 kg of mixture and 2 liters of an aqueous solution containing 20 to 100 g/l of $H_2SO_4$ are placed in contact, at a temperature of 50° C.; the mixture obtained is stirred for 30 minutes to 2 hours, and is filtered. Analyses (of the liquid and of the solution) show that about 71% of the arsenic and 78% of the copper initially present in the solid have been solubilised.

Comparative tests have shown that, at constant acidity, the temperature of prelixiviation had relatively little importance on the dissolutions of the copper, arsenic and iron but that, when the temperature exceeded about 55° C., the consumption of acid increased.

Similarly, at constant temperature, it has been ascertained that the increase in the acidity (when the quantity of sulfuric acid passes from 20 to 100 g/l) promoted the dissolution of the copper and arsenic, but at the cost of the consumption of acid coming from parasitic reactions. These tests also showed that a more energetic acid lixiviation attack generally brought about a decrease in the consumption of thiourea in pure gold lixiviation (about 2 to 3 kilos per ton of concentate) and that there was an economic compromise here.

The solid product obtained after filtration was treated by means of aqueous solutions of thiourea. 1 kg of solid was used for two litres of a solution containing 20 g of thiourea per liter. The temperature was 50° C. The potential of oxidoreduction at the beginning of reaction (5 minutes) was 150 mV; the reaction is continued for 1 hour at constant pH of 1; in the course of reaction, the potential of oxidoreduction rose regularly to be stabalised at 185 mV at the end of reaction and about 91% of gold and 60% silver present in the solid treated was solubilised for a consumption of thiourea of 8 to 10 kilos per ton of concentrate. Repeating the same experiment (same starting product and same operating conditions) but regularly adding $SO_2$ (in the form of 5% solution) so as to decrease the potential of oxidoreduction of the pulp and to maintain it at 150 mV for the whole duration of the reaction, about 91% of gold and 60 % of silver was also solubilised, but for a consumption of thiourea of 3 to 4 kilos per ton of concentrate.

By adding 10% of reducing roast to the calcines, the consumption of thiourea was also reduced to a comparable level (4 to 5 kilos per ton of concentrate) but with less good yields of gold and silver solution due to the less favourable behaviour of the reducing roast at thiourea lixiviation. The Au content of the lixiviation residues is thus systematically increased by 1 g/t with respect to the tests with $SO_2$.

The solution was separated from the solid; to 1 liter of this solution are added 50 mg of a powder of aluminum with a particle size smaller than 37 microns for 1 hr. at 70° C.; 50 mg of powder are then added again and cementation is continued at the same temperature for 1 hr. The cement collected during the second cementation may be reintroduced to the first cementation. Due to this double cementation technique and to the judicious choice of the temperature and nature of the powder of aluminum, 100% gold, 99.7% silver, 99% bismuth could be cemented in a very rich cement titrating about 3 to 5% gold, 4 to 6% silver, 50% bismuth.

What is claimed is:

1. In a process for recovering gold and/or silver and possibly bismuth contained in a sulfuretted ore and/or sulfoarsenide, said ore, from which is gangue has been removed according to known processes, is treated according to the following successive operations:
    a reducing roasting;
    an oxidising roasting;
    a possible crushing;
    a first lixiviation by a sulfuric acid solution containing about 20 to 120 g of acid per liter, at a temperature of about 20° to 85° C. and for a duration of 0.5 to 3 hrs.;
    after separation of the solid, a lixiviation of said solid effected with the aid of a sulfuric acid thiourea solution containing from 10 to 50 g/l of thiourea, at a pH of 0.7 to 1.5, at a temperature of 20° to 70° C., for a duration of 15 mins. to 15 hrs., this lixiviation being conducted so that the potential of oxidoreduction of the medium is maintained at a value of between about 100 and about 180 mV;
    and, after filtration of the solution, a cementation of said solution to recover the gold, silver and bismuth that it contains.

2. The process of claim 1, wherein the reducing roasting is effected at a temperature of about 680° to 720° C. and the oxidising roasting is effected at a temperature of about 550° to 630° C.

3. The process of one of claims 1 or 2, wherein the lixiviation by the acid thiourea solution is effected in the presence of a reducing agent.

4. The process of claim 3, wherein said reducing agent is $SO_2$.

5. The process of claim 3, wherein said reducing agent is a sulfuretted solid taken after the reducing roasting step.

* * * * *